Aug. 22, 1967 L. R. WILSON 3,337,719

METHOD AND APPARATUS FOR FORMING DATA PROCESSING CARDS

Filed Oct. 12, 1961

INVENTOR
Loren R. Wilson

By Smyth, Roston & Pavitt
Attorneys

United States Patent Office 3,337,719
Patented Aug. 22, 1967

3,337,719

METHOD AND APPARATUS FOR FORMING DATA PROCESSING CARDS

Loren R. Wilson, Pacific Palisades, Calif., assignor to The Magnavox Company, Torrance, Calif., a corporation of Delaware Filed Oct. 12, 1961, Ser. No. 144,715
12 Claims. (Cl. 235—61.12)

The present invention relates to data processing means and, more particularly, to means for recording data in two different forms on a single data storage card suitable for use in a data processing system.

Heretofore in automatic data processing systems, data is normaly all recorded in some given form on a particular media for processing by a machine. For example, the data may be stored as magnetic recordings on a magnetizable media, as perforations in paper etc. Data recorded in such a form may be read by a machine whereby it is possible to mechanically search through very large volumes of information in extremely short intervals of time. However, the results of such a search are normally in a coded form and merely refer to additional sources of information. Thus, following the conclusion of the mechanical search, it is necessary for the operator to obtain the referenced information. This last step is normally a very time consuming operation and also necessitates large volumes of space for storing the information.

By way of example, it may be desirable to make a search through a large group of patents for information relating to a particular subject matter. If the information in the patents were properly digested and recorded in a form suitable for use in prior art data processing systems, the system could be properly programmed to make a search that would reference all patents satisfying the requirements of the code. Heretofore the results of such a search have been a listing or identification of the reference material, for example, the numbers of the patents containing information of interest. It would then be necessary to obtain copies of all of the referenced material and manually continue the search. Although such means will reduce the volume of material to be manually searched to a very small amount, it is necessary to obtain printed copies of each reference. The obtaining of such copies is time consuming and/or wasteful since the large majority of even the manually searched material may be rapidly discarded with only a very small number being actually retained for any extended consideration. In addition, the storage of the copies of the patents included in the search presents a substantial problem.

It is now proposed to overcome the foregoing difficulties by providing a new and novel means for recording data for use in a data processing system whereby the data may be recorded so as to not only facilitate automatic processing thereof but to also facilitate the manual use thereof. More particularly, it is proposed to provide means wherein at least a portion of the data is recorded in a first form on a first portion of the recording medium and at least a portion of the data is recorded in a second form on a second portion of the recording medium. More particularly, it is proposed to provide a data storage card having a first portion which includes a layer of magnetic material adapted to have data magnetically recorded thereon and a second portion which includes a photographic film that is adapted to have data photographically recorded thereon. It may thus be seen that a large group of cards may be rapidly searched by a suitable data processing apparatus on the basis of the data magnetically recorded on the first portion of the card. When a card is located which satisfies the requirements of the search, the card may be automatically removed from the group without in any way impeding further mechanical searching. The data photographically recorded on the second portion of the card may then be reproduced either permanently as by printing or temporarily as by projection on a screen. As a result all of the data which is coded will be stored in a very compact volume and will be readily accessible.

These and other features and advantages of the present invention will become readily apparent from the following detailed description of one form of the invention, particularly when taken in connection with the accompanying drawings wherein like reference numerals refer to like parts and wherein.

Figure 1:
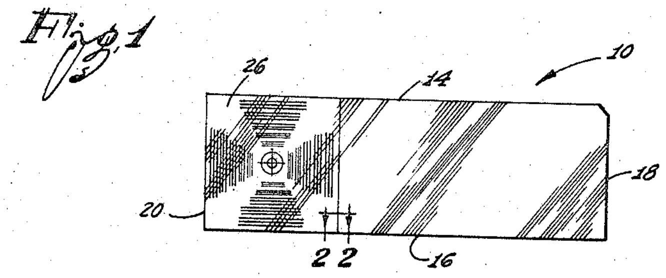
FIGURE 1 is a plan view of a data storage card embodying one form of the present invention.
Figures 2, 3, 4:
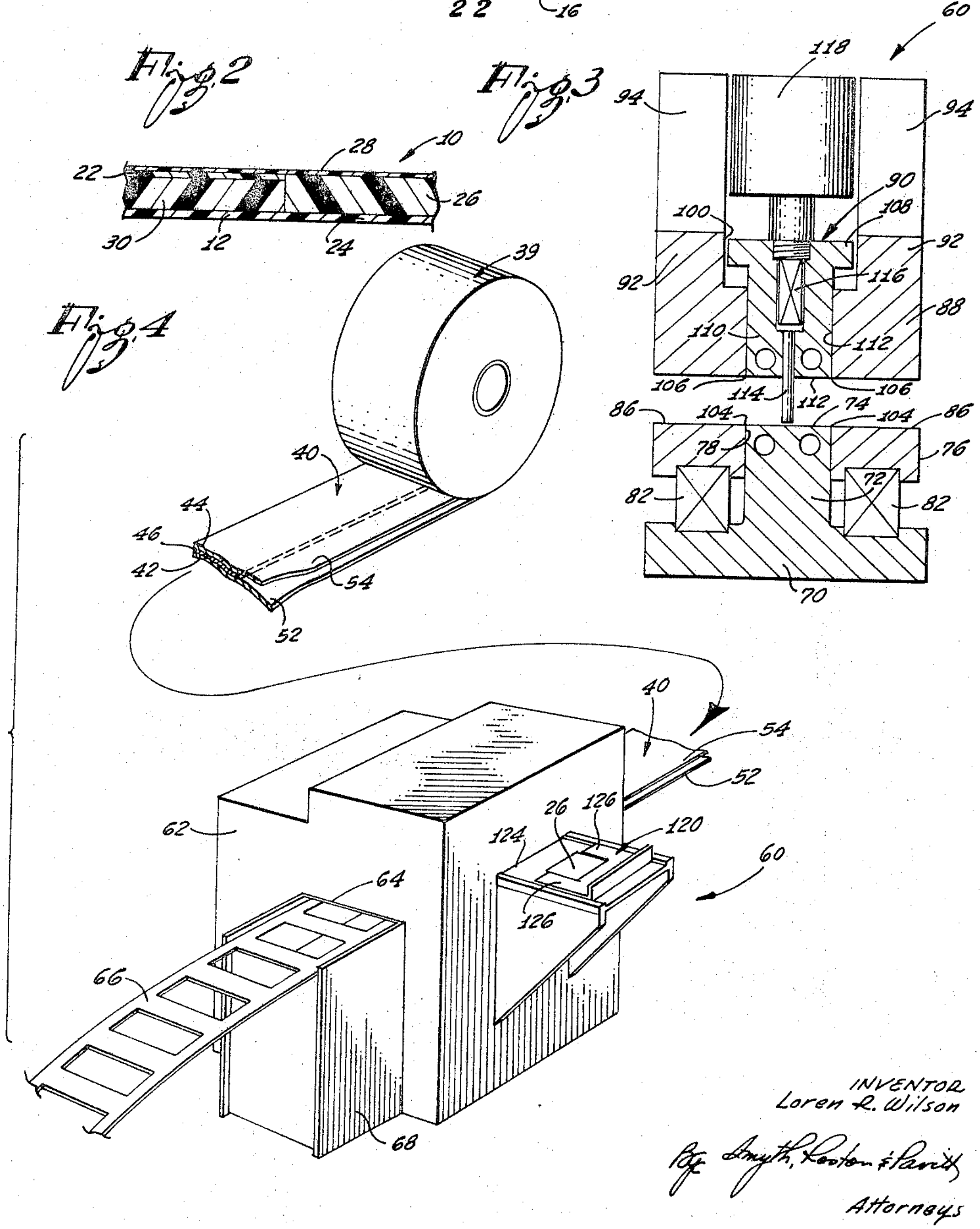
FIGURE 2 is a fragmentary cross sectional view of the data storage card in FIGURE 1 taken substantially along the plane o fline 2—2.
FIGURE 3 is a cross sectional view of a portion of means for forming the cards of FIGURE 1.
FIGURE 4 is a perspective view of the apparatus for forming the card of FIGURE 1.

Referring to the drawings in more detail and, more particularly, to FIGURES 1 and 2 thereof, the present invention is especially adapted to be embodied in a data storage card 10 for use in a data processing system such as disclosed and claimed in U.S. Patent No. 2,985,299, granted May 23, 1961. A system of this nature is adapted to process data storage cards having magnetic recordings whereby the cards can be processed and/or sorted on the basis of the magnetic recordings on the cards.

In the present instance, each of the data storage cards 10 includes a base member 12 that has a size and shape that is substantially identical to the size and shape of the card 10. For example, the base member 12 may be of a rectangular shape with a pair of parallel sides 14–16 and a pair of parallel ends 18–20. Although the card 10 may be of any suitable size, by way of example, it has ben found that a card on the order of approximately one inch wide and approximately three inches long is large enough to record an adequate amount of data while still being small enough to be handled at high rates of speed.

The base member 12 which may comprise any suitable material is preferably a light weight and flexible member 12 with at least a portion thereof being transparent. It has been found that the base member 12 may consist of a clear transparent plastic such as Mylar with a thickness on the order of one thousandth (0.001) of an inch.

In order to permit the cards 10 to be mechanically processed, a suitable recording media may be provided over at least a portion of the base member 12 for having data recorded thereon in a form suitable for use in a data processing system. In the present instance, this media is a layer 22 of a magnetizable material such as iron oxide for having data magnetically recorded thereon. It has been found that for most purposes, the layer 22 may be on the order of six ten-thousandths (0.0006) of an inch is adequate to provide a permanent signal with a high density of data recordings.

Although the area of the layer 22 may vary within wide limits, the layer 22 preferably has a width equal to the space between the sides 14–16 whereby it will extend completely across the card 10. The length of the layer 22 is preferably only a fraction of the length of the card 10. Thus, if the layer 22 extends from one end 18 toward the opposite end 20, it will thereby cover only a portion of the base member 12. As a consequence, the remaining portion of the base member 12 will not be covered. Accordingly, even though the layer 22 is opaque, the remaining portion 24 may still be transparent.

In order to permit the card 10 to be manually utilized, a suitable media may be provided on at least a portion of the base member 12 for recording data in a form that can be visually observed. In the present instance, this media is a member 26 that is suitable for having data recorded thereon in a visual form. This data may be a photographic copy of any desired data such as numbers, technical descriptions, etc. Although the photographic copy may be opaque so as to reflect an image therefrom, in the present instance, the member 26 is of the transparent variety wherein light may pass therethrough.

The present photographic member 26 is a piece of conventional photographic film with a transparent base and a layer of emulsion thereon. The overall thickness of this film may be on the order of forty-six ten-thousandths (0.0046) of an inch. The film member 26 is secured to the base member 12 by any suitable means so as to cover all of the portion 24 of the base member 12 that is free of the layer 22. Since this portion 24 of the base member 12 is transparent, it will be seen that the photographically recorded data thereon may be projected by passing light therethrough.

In order to seal and protect the magnetic and photographic data recordings, an overlay or protective cover 28 may be provided that extends over the top of the card 10. Although this cover 28 may comprise any suitable material, it has been found that a plastic film of material similar to that in the base member 12 is well suited for this use. For example, a film of Mylar five ten-thousandths (0.0005) of an inch thick is suitable.

It may be noted that the layer 22 will be of a different thickness than the film member 26. Normally the layer 22 will be the thinner of the two. Accordingly, it may be desirable to employ a mid-layer 30 which will increase the thickness in the region of the layer 22 to an amount equal to the thickness of the film member 26. In the present instance, a mid-layer on the order of four thousandths (0.004) of an inch will result in a card 10 of substantially uniform thickness over the entire length thereof.

Although cards 10 of the foregoing description may be produced by any suitable means, it has been found desirable to form them from a continuous roll 39 of a strip 40 specially prepared for this purpose. This strip 40 may include a base ribbon 42, a cover ribbon 44 and a mid-section 46 that is secured therebetween. More particularly, for forming the card 10 described above, the base ribbon 42 would consist of Mylar approximately one thousandth (0.001) of an inch thick and with a width slightly greater than the length of the card 10. The cover ribbon 44 may also consist of Mylar and have a thickness equal to that of the cover member 28, i.e., five ten-thousandths (0.0005) of an inch. The width of this ribbon 44 is preferably equal to the width of the base ribbon 42. The mid-section 46 includes a mid-layer ribbon with a magnetic strip thereon. This ribbon and strip are secured to the ribbons 42 and 44 along one side thereof.

The overall thickness of the mid-section 46 is preferably equal to the thickness of the film member 26 to be employed. In addition, the width of the mid-section 46 is substantially less than the width of the base ribbons 42 and 44. Thus, there will be wide portions 52 and 54 of the base ribbon 42 and cover ribbon 44 that are transparent and free of each other.

In order to form the cards 10 from the strip 40, the strip 40 may be fed through a compound die 60 such as shown in FIGURES 3 and 4. This compound die 60 may be enclosed in a housing 62 having an opening in one side adapted to have the strip 40 fed therethrough. The opposite side of the housing 62 may include an opening 64 through which the scrap portions 66 will pass so that the finished cards 10 may be accumulated in a magazine 68.

The operative elements of the die 60 may be disposed inside of the housing 62. A base 70 may be provided that is adapted to support the housing 62. The present base 70 includes a punch 72 that projects upwardly to form a raised platform or work surface 74. This surface 74 is preferably disposed in substantial alignment with the openings in the opposite sides of the cutter 88. This surface 74 is also preferably substantially the same size and shape as the finished card 10. An outer member 76 may be reciprocally mounted around the punch 72 so as to be capable of moving vertically up and down thereon. The center of the member 76 includes a rectangular passage 78 that is large enough to permit the punch 72 to extend therethrough. A spring means 82 may be provided that seats on a shoulder 84 and pushes upwardly against the bottom of member 76 to resiliently retain it in its fully raised position. When in this fully raised position, a flat surface 86 on the top of the member 76 will form a smooth continuation of the work surface 74.

The upper portion of the die 60 includes an outer cutter 88 with a center press 90. The outer cutter 88 is reciprocally supported so as to be free to move vertically up and down. The upper end of the cutter 88 includes a cam surface 92 that engages a pair of cams 94 that are free to rotate about the axis 96. The center of the cutter 88 includes a passage that has an upper portion 100 and a lower portion 102. The lower portion 102 is substantially rectangular and just large enough to permit the punch 72 to fit therein.

It may thus be seen that when the cams 94 rotate, they will cause the cutter 88 to descend. During this movement the bottom of the cutter 88 will engage the surface 86 on the top of member 76. If the downward movement continues, the cutter 88 will depress the member 76 against the spring means 82 and the punch 72 will then extend into the lower portion 102 of the passage. It may be seen that the edges 104 and 106 will act as shears.

The center press 90 is disposed in the passage through the cutter 88. The upper end of the press 90 includes an enlarged portion 108 that is slidably disposed in the upper portion 100 of the passage 98. The lower end of the press 90 includes a rectangular portion 110 adapted to register with the surface 74 on the upper end of the pedestal 72. Thus, the surface 112 on the press will then engage and bear uniformly against the surface 74.

One or more fingers 114 may be provided that are reciprocally mounted in the lower end of the press. When the fingers 114 are in the extended position, they will terminate slightly above the surface 74. However, as soon as the press 90 descends, they will engage the surface 74 and be held thereagainst by the springs 116.

The portion 108 on the upper end of the press 90 may be connected to a hydraulic ram 118. This ram 118 is mounted between the cams 94 and is effective to exert a downward force that will be effective to cause the press to move downwardly through the passage 98.

An inserter 120 may be provided for placing the photographic member in position. The inserter 120 may include an arm that is mounted on a suitable mechanism such as a hydraulic ram for moving the inserter 120. The arm is disposed adjacent the front side of the housing 62 so as to be extendable through and retractable from an opening 124 therein. The outer end of the arm 122 includes a pair of fingers 126 that are separated from each other by slightly more than the width of the punch 72. These fingers 126 are adapted to have a film member 26 disposed thereon so that it may be easily removed therefrom.

In order to form the cards 10 by employing the die 60, the strip 40 may be fed laterally through the housing 62. The strip 40 will thus pass over the surfaces 74 and 86 on the pedestal 72 and the outer member 76 but below the lower ends of the fingers 114. The side of the strip 40 having the mid-section 46 with the magnetic strip thereon is disposed toward the rear of the die 60. The loose portions 52 and 54 are disposed toward the front of the die so as to open toward the inserter 120. The strip 40 is advanced to place a fresh or unused section thereof over the end of the pedestal 72. The film member 26 is placed between the fingers 126 of the inserter 120. The inserter 120 is then advanced through the opening 124 and between the loose portions 52 and 54. Although the film member 26 may be unexposed, it preferably has been previously exposed and developed so as to have a visible photographic image thereon. In addition, the film member 26 is preferably coated with an adhesive layer.

After the inserter 120 has placed the film member 26 in position, the hydraulic ram 118 may be activated so as to drive the press 90 downwardly. As soon as this motion commences, the fingers 114 will engage the cover ribbon 44 and press it and the film member 26 downwardly against the base ribbon 42 and retain them all fixed in position. The downward motion of the press 90 may then continue until the surface 112 on the end thereof engages the cover ribbon 44 and compresses them all against the surface 74. Simultaneously therewith, the inserter 120 may be retracted through the opening 124.

In the event the film member 26 is coated with a thermal plastic adhesive, heating elements 128 such as an electric filament pipe may be disposed adjacent the surfaces 74 and 112 for raising the temperature thereof. Thus, the heat may be applied therethrough so as to cause the adhesive on the film member to be activated whereby the cover and base will be bonded together.

The cams 94 may also be rotated so as to cause the cutter 88 to descend around the press 90 and the pedestal 72. This motion will cause the outer member 76 to be forced downwardly against the springs 82. The edges 104 and 106 will then shear the strip 40 and leave a card 10 compressed between the pedestal 72 and the press 90. The cutter 88 and the press 90 may then be retracted until the fingers 114 release the card 10. The completed card 10 may then be advanced and ejected into the magazine 68. A new portion of the magnetic strip 40 may then be advanced so that the above process may be repeated.

Although the present invention has been disclosed and illustrated with reference to a particular application, it will be readily apparent to a person skilled in the art that the principles involved are susceptible of numerous other embodiment without departing from the spirit thereof. Accordingly, the foregoing description is merely illustrative and the invention is to be limited only as defined by the following claims.

What is claimed is:

1. Means for recording data in two different forms for use in a data processing apparatus, said means comprising the combination of a base member consisting of a ribbon of transparent material having a pair of parallel edges extending longitudinally thereof with the space between said edges defining the width of said base member, a layer of magnetic material for having data magnetically recorded thereon, said layer extending longitudinally of said base member and having a width substantially less than the width of said base member and being secured to said base member adjacent one of said edges so as to extend longitudinally thereof and thereby provide an exposed portion of said base member, and a cover member consisting of a transparent ribbon having a width substantially equal to the width of said first ribbon, said cover being secured over said layer to thereby provide an exposed portion registering with said first exposed portion, a photographic member secured between the base and cover members in the space between the base and cover members and formed from photographic film for thereby photographically storing data adjacent said magnetically recorded data.

2. A strip for forming cards for recording data thereon in two different forms, said means comprising the combination of a base member of transparent material having a pair of parallel edges extending longitudinally thereof and separated by a distance approximately equal to the width of said card, a layer of magnetic material for having data magnetically recorded thereon, the layer being disposed on said base member adjacent one of said edges to extend longitudinally thereof, said layer having a width substantially less than the width of said base member whereby a portion of said base member adjacent said opposite edge will be free of said magnetic material and transparent, and a series of photographic members formed from photographic film and secured to the base member in the space free of the layer of magnetic material so that said strip may be severed normal to said edges to form a plurality of cards each of which has a magnetic layer adjacent one end and a photographic member adjacent the other end.

3. A strip for forming cards for recording data in two different forms for use in a data processing apparatus, said means comprising the combination of a base member of transparent material having a pair of parallel edges extending longitudinally thereof with the space between said edges being substantially equal to the width of said cards, a layer of magnetic material for having data magnetically recorded thereon, said layer having a width substantially less than the width of said base member and being disposed over a portion of said base member adjacent one of said edges so as to extend longitudinally thereof to thereby provide a transparent exposed portion of said base member, a midlayer disposed over said portion in substantial registry with said magnetic layer, a cover member of transparent material having a width substantially equal to the width of said base member, said cover being secured over said layers to thereby provide a second transparent exposed portion registering with said first exposed portion, and a series of photographic members secured between the base and magnetic members in the portion not occupied by the layer of magnetic material and formed from magnetic film, said photographic member having a thickness substantially equal to the thickness of said layers whereby said strip may be severed transversely thereof to form a plurality of cards that are of substantially uniform thickness and have a magnetic layer adjacent one end and a photographic member adjacent the other end thereof.

4. A data storage card for having data magnetically and photographically recorded thereon, said card comprising the combination of a base member having a shape substantially identical to said card, an opaque layer of magnetic material disposed over at least a portion of said base member to thereby have data magnetically recorded thereon, transparent photographic means disposed over the remaining portion of said base member and formed from a photographic film for having data photographically recorded thereon, and a transparent cover member having a shape substantially identical to said card disposed over said layer and said means to form a layer and said means to form a protective cover whereby said card will be substantially uniformly thick.

5. A data storage card for having data megnetically and photographically recorded thereon for use in a data processing apparatus, said card comprising the combination of a base member consisting of transparent material and having a shape substantially identical to said card, a layer of magnetic material disposed over said base member to thereby cover only a portion of said base member, a transparent photographic means disposed on said base member and covering substantially all of the remaining portion of said base member and formed from a photographic film and having data photographically recorded thereon, a cover member consisting of a transparent material disposed over said photographic member and said layer of magnetic material for enclosing and protecting them so that said last data may be photographically reproduced by projecting light through said photographic member.

6. A rectangular data storage card for having data magnetically and photographically recorded thereon for use in a data processing apparatus, said card comprising the combination of a rectangular base member consisting of a transparent material and having a pair of parallel sides and a pair of opposite ends, a layer of magnetic material having a width equal to the space between said sides and extending from one of said ends toward the opposite end thereof to thereby cover only a portion of said base member, a transparent photographic member disposed on said base member so as to extend from said magnetic layer to the other of said ends to thereby cover substantially all of the remaining portion of said base member and having data photographically recorded thereon, and a rectangular cover member having a size substantially identical to said base member disposed over said layer of magnetic material and said photographic member for enclosing and protecting them so that said last data may be photographically reproduced by projecting light through said photographic member.

7. A rectangular data storage card for having data magnetically and photographically recorded thereon for use in a data processing apparatus, said card comprising the combination of a rectangular base consisting of a transparent material and having a pair of parallel sides and a pair of opposite ends, a rectangular photographic member formed from a photographic film and having a width substantially equal to the width of said base member between said sides secured to said base adjacent one end thereof to thereby cover only a portion of said base member, said photographic member having data photographically recorded thereon, a layer of magnetic material disposed over said base member so as to cover the remaining portion of said base member for having data magnetically recorded thereon, a midlayer member disposed over said remaining portion, said midlayer member and said magnetic layer having a thickness equal to the thickness of said photographic member, and a cover member consisting of a transparent material disposed over said layers and said members for enclosing and protecting them and to thereby form a card of substantially uniform thickness.

8. The process of making a card for having data recorded thereon in two different forms comprising the steps of providing a strip including a transparent base member and transparent cover member which are secured together only along a portion adjacent one side thereof with a layer of magnetic material disposed in said portion, positioning a photographic film in the space between the remaining portions of said base and cover members, securing said members together for retaining said photographic film in position, and cutting at least said base and cover members transversely thereof to thereby provide a card with the layer of magnetic material adjacent one end and the photographic film adjacent the opposite end.

9. The process of making a plurality of data storage cards, including the steps of: providing a continuous strip having a transparent base member and a transparent cover member with a layer of magnetic material disposed between a portion thereof adjacent one side of said strip whereby the remaining portions of said members will be separated from each other by an open space, inserting a plurality of photographic members into the space between said remaining portions at periodic intervals therealong, securing said members together in the areas adjacent said photographic films to thereby secure and retain said photographic films in position, and cutting said strip transversely thereof to provide a plurality of said cards with each of said cards including a photographic film adjacent one end and a layer of magnetic material adjacent the other end.

10. The process of making a plurality of data storage cards, including the steps of: providing a continuous strip having a transparent base member and a transparent cover member with a layer of magnetic material disposed between a portion thereof adjacent one side of said strip whereby the remaining portions of said members will be separated from each other by an open space, providing a plurality of members formed from photographic films and having developed photographic images thereon, positioning said last members on the remaining portion of said base member between the transparent base member and the transparent cover member at periodic intervals therealong, securing said base and cover and photographic-image members together, and severing said strip at periodic intervals between said images to thereby provide said cards.

11. The process of making a plurality of data storage cards, including the steps of: providing a continuous strip having a transparent base member and a transparent cover member with a layer of magnetic material disposed between a portion thereof adjacent one side of said strip whereby the remaining portions of said members will be separated from each other by an open space, providing a plurality of photographic members formed from photographic films and having developed photographic images thereon, positioning said last members on said base member in the space between said remaining portions of said transparent base and cover members, compressing said base and cover and photographic members together in the area adjacent said photographic members, heating said base and cover and photographic members to a significant temperature to cause said members to be bonded together, and cutting said strip into shapes corresponding to said cards.

12. The process of making a data storage card, including the steps of: providing a continuous strip having a transparent base member and a transparent cover member with a layer of magnetic material disposed between a portion thereof adjacent one side of said strip whereby the remaining portions of said members will be separated from each other by an open space, providing a photographic member formed from a photographic film and having a developed photographic image thereon, positioning said photographic member on said base member in the space between said remaining portions of said base and cover members, compressing said base and cover members and said photographic member together in the area adjacent said photographic member, heating said base and cover members and said photographic member to a sufficient temperature to cause said members to be bonded together, and punching strip to thereby provide a card having magnetic data storage means at one end and photographic storage means at the opposite end.

References Cited

UNITED STATES PATENTS

| | | | |
|---|---|---|---|
| 2,098,359 | 11/1937 | Reynolds | 235—61.12 |
| 2,206,206 | 7/1940 | Smith | 235—61.12 |
| 2,353,002 | 7/1944 | Armbruster | 235—61.12 |
| 2,491,807 | 12/1949 | Freedman | 235—61.12 |
| 2,512,106 | 6/1950 | Langan | 235—61.12 |
| 2,545,804 | 3/1951 | Butler | 235—61.12 |
| 2,633,774 | 4/1953 | Rounsefell | 235—61.12 |
| 2,693,909 | 11/1954 | Allan | 235—61.12 |
| 2,914,746 | 11/1959 | James. | |

MAYNARD R. WILBUR, *Primary Examiner.*

DARYL W. COOK, MALCOLM A. MORRISON, *Examiners.*

P. J. HIRSCHKOP, W. S. POOLE, J. F. MILLER, *Assistant Examiners.*